James M. Carpenter's
Screw Cutting Machine.
No. 119,916.  Patented Oct. 17, 1871.
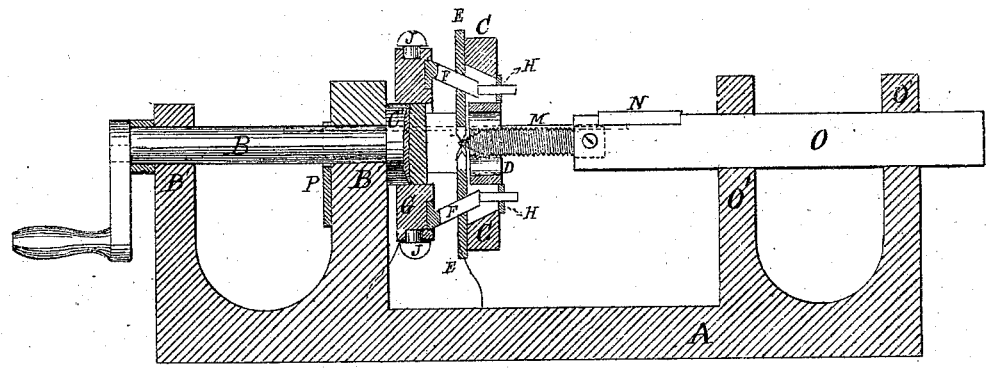
Fig. 2.
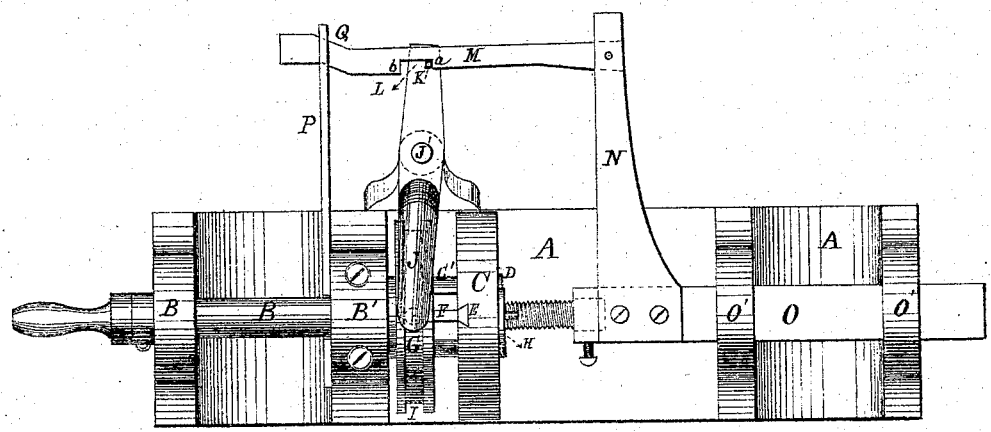
Fig. 1.
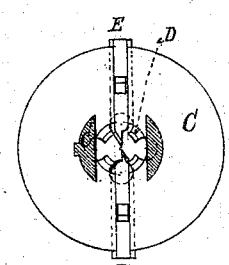    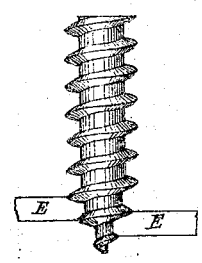  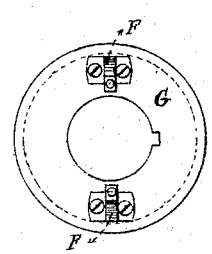
Fig. 3.    Fig. 5.    Fig. 6.    Fig. 4.
WITNESSES.                        James M. Carpenter  INVENTOR.

119,916

UNITED STATES PATENT OFFICE.

JAMES M. CARPENTER, OF PAWTUCKET, RHODE ISLAND.

IMPROVEMENT IN MACHINES FOR CUTTING SCREWS.

Specification forming part of Letters Patent No. 119,916, dated October 17, 1871.

*To all whom it may concern:*

Be it known that I, JAMES M. CARPENTER, of Pawtucket, in the county of Providence and State of Rhode Island, have invented certain Improvements in Machines for Cutting Screws, of which the following is a specification:

My invention relates to the construction of screw-cutting machines for forming the threads on lag or coach-screws, so called, or other screws which are screwed into wood, by means of which a conical threaded point known as the "gimlet-point," may be formed thereon. In the manufacture of lag-screws of the ordinary kind they are threaded in dies which cut the thread by once passing over the screw, there being sufficient strength in the body of the screw to sustain the torsional strain in removing the metal between the threads if the dies are properly made. This method of forming the thread is both economical and expeditious, but it can only form the thread of sensibly the same diameter in all parts. In the manufacture of lag-screws with gimlet-points they are threaded by a machine similar to that used in the manufacture of gimlet-pointed wood screws, in which the thread is formed by a single tool or chaser, which removes the metal between the threads by repeatedly passing over the length of the thread with successive cuts. Now, the purpose of my invention is to form a gimlet-point on the screw when it is cut in dies; and consists in combining with the dies which cut the body of the screw, made in any of the well-known forms, one or more tools or chasers placed at the back side of the dies, and having a motion toward and from the axis of the screw and working in suitable guides; which tools are set in such relation to each other and to the thread formed by the dies that they will follow each other with successive cuts, if more than one tool is used in forming the point of the screw, and will also coincide with the thread formed by the dies upon the body of the screw, so that the thread formed on the point will be a continuation of that formed on the body. By this means the dies act as a rest to hold the body of the screw firmly while the point is being formed by the tools, which have a simultaneous movement toward and from the axis of the screw so graduated to the progressive motion of the dies or screw, as the case may be, that their united action will give to the point the tapering form required at the same time that the dies are cutting the thread upon the body.

In the drawing, Figure 1 is a plan of the machine. Fig. 2 is a vertical longitudinal section. Fig. 3 is a sectional elevation of the back side of the die-stock. Fig. 4 is a front elevation of the cam-ring detached. Fig. 5 is a view of the point of a screw-blank before cutting the thread upon it, and Fig. 6 is a view of the finished gimlet-point.

A is the frame or bed of the machine; and B is a revolving mandrel, supported therein in suitable bearings B', upon the inner end of which is mounted the die-stock C, which carries the dies D for cutting the cylindrical portion of the screw-thread. There is a circular aperture in the center of the stock, behind the dies, which extends through to the back side of the stock and into the hub of the same a sufficient distance to receive the longest screw to be made. In the back side of the stock are two radial dovetailed recesses, E E, for cutting the thread upon the point of the screw, which slide in said recesses toward and from the center to give the requisite taper to the thread by means of the diagonal slides or cams F, shown more clearly in Fig. 2. The slides F are attached to the cam-ring G at one end, and at the other end they work through guides H attached to the die-stock. The intermediate portions of the slides are made diagonal to the axis of the mandrel, and work through mortises in the cutters E, so that when the cam-ring G is slid along longitudinally on its bearing, carrying the several slides with it, the slides move the cutters E radially toward and from the axis under perfect control. The cam-ring G is fitted upon the hub C' of the die-stock, as shown, and the hub is made with openings into the central cavity through which the cutters E work. In the periphery of the cam-ring G is formed a groove, I, in which the forked lever J works, by means of which the ring G is moved toward and from the die-stock C to move the cutters E in or out. The lever J has its fulcrum at J', and at its outer end a pin, K, which works in the long notch L formed in the sliding bar M. The bar M is attached at one end to the arm N which is carried upon the holder O by which the screw is held while being cut. The opposite end of the bar M works through a mortise in the bracket P, which is attached to the frame of the machine. The holder O is mounted in the standards O', so as to be free to slide lengthwise but not to revolve, and is provided at its inner end with a socket to receive the head of the screw and hold it from revolving. It is intended to be moved back and forth by the hand, except when moved by the screw-thread which is formed to bring the screw up to the dies, or to remove the screw and insert a fresh blank. The end of the bar M, near the bracket P, is made with an inclined part, Q, as shown, which works through the mortise in the bracket P, and when the bar is moved in that direction so that the inclined part has passed through the mortise it has the effect to move that end of the bar laterally so far outward that the notch L is removed from the pin K, which leaves the lever J at rest although the movement of the bar continues. When the movement of the bar M is reversed the action of the incline Q causes the notch L to again engage with the pin K and move the cam-ring back, and withdraw the slides F which move the cutters E inward to the center in an obvious manner. In this condition of the parts the holder can be drawn back a sufficient distance to enable the screw to be removed therefrom and a fresh blank inserted clear of the dies. The points of the cutters are made of the proper form to give the desired form to the thread, and to correspond to the form of the thread produced by the dies upon the body of the screw, and they are also set to correspond to the position they would occupy, respectively, in the thread in forming the conical point, as is shown in Fig. 6; and, although I have shown in the drawing only two cutters placed opposite each other, in cutting coarse threads where considerable metal has to be removed I propose to use three or four, set radially around the circumference to divide the labor among a greater number of cuts.

In cutting screws with this machine the blanks are first pointed by a separate machine in the manner usually employed in the manufacture of wood-screws, as is shown in Fig. 5. The holder O being drawn back the head of the screw is placed in its socket and the holder is carried forward until the point of the blank is inserted in the dies. By the revolution of the dies the screw is cut upon the body of the blank, at the same time drawing the holder forward and with it the bar M. The position of the notch L is so adjusted in relation to the dies that when the shoulder $a$ of the notch comes in contact with the pin K the point of the blank will have reached the cutters E and commenced to cut the thread upon the point. By the progressive motion of the screw-holder and bar M the cam-ring will be carried forward through the intervention of the lever J, and by means of the slides F will withdraw the cutters E just fast enough to give the conical form to the screw-thread, each cutter removing a portion of the metal and passing into the thread formed by the dies. By the time that this is done the inclined part Q of the bar M will have passed nearly through the mortise in the bracket P, and carried the shoulder $a$ of the notch L off from the pin K, which will leave the lever J at rest while the dies continue their operation until the thread is completed. The motion of the mandrel and dies is then reversed to back the dies off from the screw, and the holder O and bar M is moved back, when the incline Q carries the notch L on to the pin K and the shoulder $b$ carries the lever J backward until the screw is out of the dies. The holder O is then drawn back by hand to remove the screw, and also to carry the cam-ring G back and place the cutters E in position to cut another screw.

Although I have shown a machine in which the dies are made to revolve to cut the thread while the blank is held, it is obvious that the same mode of opertion could be employed if the dies were made stationary and the screw-blank was rotated; and many other arrangements of mechanism could be used to control the motion of the cutters E, and I have devised several for that purpose; and any other form of dies operating in the usual way could be used for cutting the body of the screw instead of those shown; and many other modifications of a like nature could be used embodying the same principles and mode of operation.

What I claim is—

The combination of one or more cutters for forming a tapering thread on the point of the screw with the dies for forming the thread upon the body, substantially as described.

Executed at Boston, Massachusetts, this 13th day of August, 1870.

JAMES M. CARPENTER.

Witnesses:
WM. C. HIBBARD,
N. C. LOMBARD.